United States Patent
Fuemmeler

(10) Patent No.: US 9,483,957 B1
(45) Date of Patent: Nov. 1, 2016

(54) METHODS, SYSTEMS, AND COMPUTER READABLE MEDIA FOR PROMOTING BEHAVIORAL INTERVENTION VIA EVIDENCE-BASED RECOMMENDATIONS AND GAME MECHANICS

(71) Applicant: Duke University, Durham, NC (US)

(72) Inventor: Bernard Frank Fuemmeler, Durham, NC (US)

(73) Assignee: Duke University, Durham, NC (US)

( * ) Notice: Subject to any disclaimer, the term of this patent is extended or adjusted under 35 U.S.C. 154(b) by 359 days.

(21) Appl. No.: 14/038,051

(22) Filed: Sep. 26, 2013

Related U.S. Application Data

(60) Provisional application No. 61/707,631, filed on Sep. 28, 2012.

(51) Int. Cl.
*G09B 19/00* (2006.01)

(52) U.S. Cl.
CPC ................................ *G09B 19/00* (2013.01)

(58) Field of Classification Search
CPC ...................................................... G09B 19/00
See application file for complete search history.

(56) References Cited

U.S. PATENT DOCUMENTS

2008/0311968 A1* 12/2008 Hunter .................. A63F 13/12
463/1

OTHER PUBLICATIONS

Fuemmeler et al., "Designing a Smartphone App for Health Promotion in Adolescent Cancer Survivors: Mila Celestial Bloom," Poster Presentation. Society for Behavioral Medicine Conference (1 page) (Apr. 11-14, 2012).

* cited by examiner

*Primary Examiner* — Sam Yao
*Assistant Examiner* — Evan Page
(74) *Attorney, Agent, or Firm* — Jenkins, Wilson, Taylor & Hunt

(57) ABSTRACT

The subject matter described herein includes methods, systems, and computer readable media for promoting behavioral intervention via evidence-based recommendations and game mechanics. According to one aspect, a method for promoting behavioral intervention via evidence-based recommendations is provided. The method occurs at a computing platform including a processor and memory. The method includes receiving information regarding characteristics and/or activities of a user, wherein the user is associated with a medical condition or an age group. The method further includes determining, using the received information and predetermined health information associated with the medical condition or the age group, an action for promoting behavioral intervention. The method also includes providing the action or information associated with the action to the user.

36 Claims, 8 Drawing Sheets

Mila

My account Log out

Live Game Stats
Last game cycle: 2013-04-10 10:38:02AM (kick)
Next game cycle: 44 sec

| Home | Activities | Challenges | Currency | Expeditions | Fireside Chat | Fuel | History | Points | Steps Report | Weight Report |

Home

Navigation
▷ Add content
▷ Recent posts

🎮 Game Management
Chat Message Templates
🏁 Expedition Progress
✱ Game Configuration
👥 Manage Game Participants
🎖 Badge Statistics 🌐 Game Resources

Expedition Progress

Expedition #:1

| Name | Uid | User Level | Points | Points Goal | Raw % Complete | Final Expedition Progress | Points Goal |
|------|-----|-----------|--------|-------------|----------------|---------------------------|-------------|
| choe | 573 | Trainee I | 40000 | 40000 | 100.00 | 100 | 40 000 |
| dami | 574 | Trainee I | 70586 | 40000 | 176.47 | 100 | 40 000 |
| jann | 572 | Trainee I | 1055841 | 40000 | 2639.60 | 100 | 40 000 |
| kon | 578 | Trainee I | 40593 | 40000 | 101.48 | 100 | 40 000 |
| lata | 575 | Trainee I | 46201 | 40000 | 115.50 | 100 | 40 000 |
| merl | 571 | Trainee I | 105390 | 40000 | 263.48 | 100 | 40 000 |
| sam | 570 | Trainee I | 40000 | 40000 | 100.00 | 100 | 40 000 |
| trilo | 575 | Trainee I | 40000 | 40000 | 100.00 | 100 | 40 000 |
| vor | 579 | Trainee I | 40000 | 40000 | 100.00 | 100 | 40 000 |
| yori | 577 | Trainee I | 58611 | 40000 | 146.53 | 100 | 40 000 |

Expedition #:2

METHODS, SYSTEMS, AND COMPUTER READABLE MEDIA FOR PROMOTING BEHAVIORAL INTERVENTION VIA EVIDENCE-BASED RECOMMENDATIONS AND GAME MECHANICS

CROSS REFERENCE TO RELATED APPLICATIONS

This application claims the benefit of U.S. Provisional Patent Application Ser. No. 61/707,631, filed Sep. 28, 2012, the disclosure of which is incorporated herein by reference in its entirety.

GOVERNMENT INTEREST

This invention was made with government support under Grant Nos. 1R21CA155965 and 1K07CA124905 awarded by the National Institutes of Health. The government has certain rights in the invention.

COPYRIGHT NOTICE

Contained herein is material that is subject to copyright protection. The copyright owner has no objection to the reproduction of the patent disclosure by any person as it appears in the U.S. Patent and Trademark Office files or records, but otherwise reserves all rights to the copyright whatsoever.

TECHNICAL FIELD

The subject matter described herein relates generally to promoting behavioral intervention. More particularly, the subject matter described herein includes methods, systems, and computer readable media for promoting behavioral intervention via evidence-based recommendations and game mechanics.

BACKGROUND

Adolescent survivors of childhood cancers, such as Acute Lymphoblastic Leukemia, are at risk for a number of long-term health problems. Interventions are difficult to deliver to this population due to their geographically dispersed nature, and to the fact that they make fewer clinic visits during adolescence. These difficulties make distance-based strategies desirable. Although it is strongly recommended that adolescent survivors of childhood cancer maintain a healthy lifestyle throughout adolescence and into adulthood, few interventions have been developed specifically for this population. Many pediatric hematology and/or oncology programs have long-term survivor clinics during which routine check-ups are performed. Often, the only source of health education aimed communication that will occur at these clinic visits are universal patient advice or generic print brochures. Accordingly, a need exists for methods, systems, and computer readable media for promoting behavioral intervention via evidence-based recommendations and game mechanics.

SUMMARY

The subject matter described herein includes methods, systems, and computer readable media for promoting behavioral intervention via evidence-based recommendations and game mechanics. According to one aspect, a method for promoting behavioral intervention via evidence-based recommendations is provided. The method occurs at a computing platform including a processor and memory. The method includes receiving information regarding characteristics and/or activities of the user of a user, wherein the user is associated with a medical condition or an age group. The method further includes determining, using the received information and predetermined health information associated with the medical condition or the age group, an action for promoting behavioral intervention. The method also includes providing the action or information associated with the action to the user.

A system for promoting behavioral intervention via evidence-based recommendations is also disclosed. The system includes a computing platform including a processor and memory. The computing platform includes a behavioral intervention module (BIM) configured to receive information regarding characteristics and/or activities of a user, wherein the user is associated with a medical condition or an age group, to determine, using the received information and predetermined health information associated with the medical condition or the age group, an action for promoting behavioral intervention; and to provide the action or information associated with the action to the user.

The subject matter described herein may be implemented in software in combination with hardware and/or firmware. For example, the subject matter described herein may be implemented in software executed by a processor (e.g., a hardware-based processor). In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to software in combination with hardware and/or firmware for implementing features described herein. In some embodiments, a module may include a field-programmable gateway array (FPGA), an application-specific integrated circuit (ASIC), or a processor.

Several aspects of the presently disclosed subject matter having been stated hereinabove, and which are achieved in whole or in part by the presently disclosed subject matter, other aspects and objects will become evident as the description proceeds when taken in connection with the accompanying Figures as best described herein below.

BRIEF DESCRIPTION OF THE DRAWINGS

The subject matter described herein will now be explained with reference to the accompanying drawings of which:

FIG. 7 is a diagram illustrating an exemplary web-based interface for monitoring user progress according to an embodiment of the subject matter described herein.

DETAILED DESCRIPTION

The subject matter described herein discloses methods, systems, and computer readable media for promoting behavioral intervention. While successful advancements in treatment for cancers, such as childhood Acute Lymphoblastic Leukemia (ALL), and other medical conditions have resulted in a growing number of survivors, these survivors can be at risk for a number of long-term health problems, including cardiovascular and cerebrovascular disease, insulin resistance, osteoporosis, and obesity. These problems can be exacerbated by unhealthy lifestyle behaviors such as low or minimal physical activity, poor diet quality, and resultant weight gain. Unfortunately, there are few interventions aimed to increase physical activity and healthy dietary intake among such survivors.

Aspects of the present subject matter described herein promote behavioral intervention (e.g., lifestyle changes) via evidence-based recommendations. In some embodiments, promoting behavioral intervention may occur at or include an application (also referred to herein as "app") executing on a processor associated with a mobile device (e.g., a smartphone or a tablet device) or other computing platform (e.g., a server or a computerized medical instrument).

Figure 1:
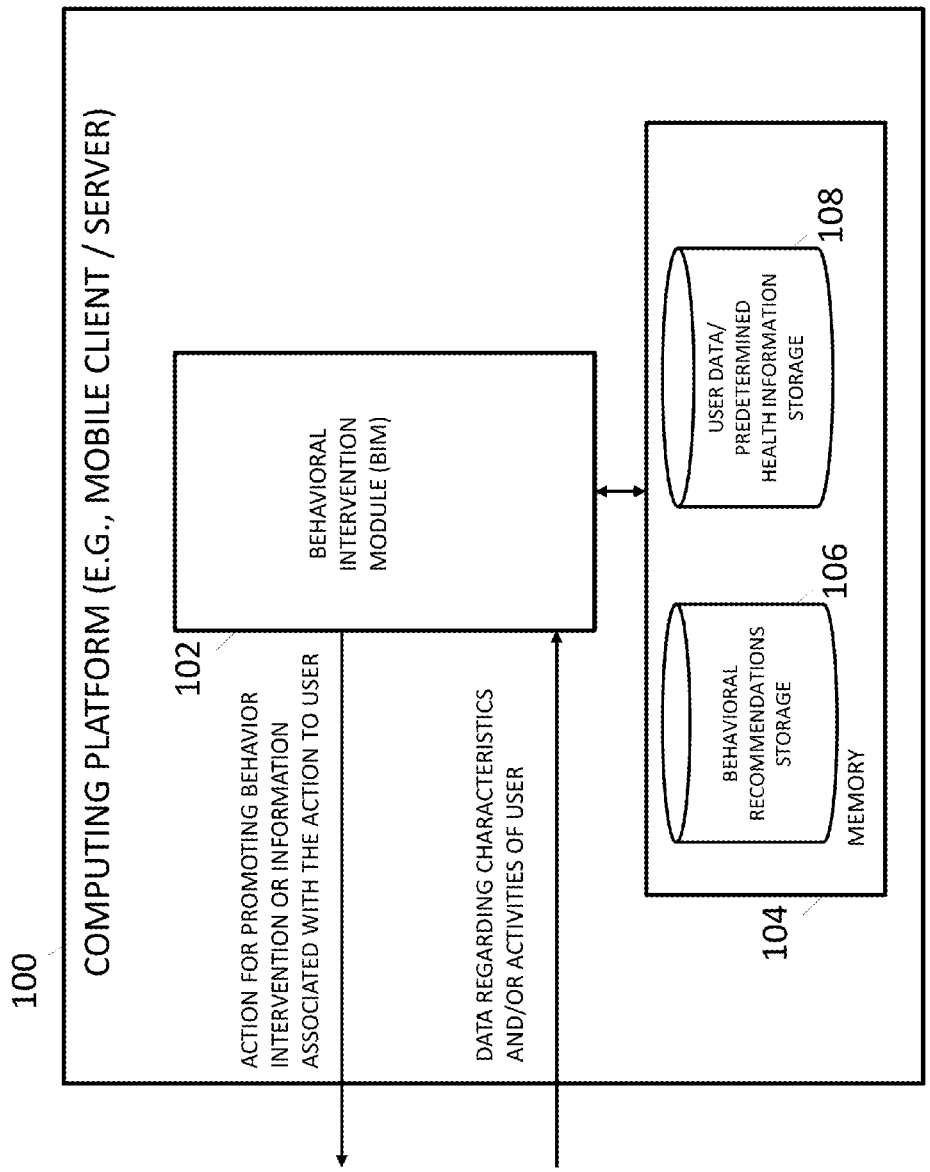
FIG. 1 is a diagram illustrating an exemplary computing platform for promoting behavioral intervention according to an embodiment of the subject matter described herein.

FIG. 1 is a diagram illustrating an exemplary computing platform 100 for promoting behavioral intervention according to an embodiment of the subject matter described herein. Computing platform 100 may be any suitable entity (e.g., a mobile device or a server) configurable to promote behavioral intervention and/or provide actions for promoting behavioral intervention (e.g., behavioral recommendation, health-related instructions (e.g., request or schedule a doctor visit, etc.), and/or biometric analysis (e.g., blood pressure monitoring, weight tracking, etc.). For example, computer platform 100 may include a memory and a processor for executing a module (e.g., an application, a mobile app, or other software) for promoting behavioral intervention via evidence-based recommendations and/or game mechanics.

Computing platform 100 may include a behavioral intervention module (BIM) 102 and a memory 104. BIM 102 may be any suitable entity (e.g., software executing on a processor) for promoting behavioral intervention. BIM 102 may be configured to receive information from or about a user (e.g., via a graphical user interface (GUI), exercise equipment, or a text file), determine an action for promoting behavioral intervention, and/or provide the action or information associated with the action to the user.

In some embodiments, BIM 102 may include an app that uses game mechanics to promote behavioral intervention by interacting with users or classes of users (e.g., people associated with one or more diseases or conditions and/or an age group). The app may encourage self-monitoring and may reward real-life activities with virtual "game-based" rewards or recognition. The app may also allow users to log physical activities, such as steps walked or miles ran, and log dietary activities, such as daily caloric intake or types of food eaten. For example, a wireless pedometer or other sensor may be used for logging physical activity information (e.g., a step count) and may be capable of providing the physical activity information to the app or BIM 102, e.g., via wireless transmittal or electronic transfer. In some embodiments, BIM 102 or another module may provide a reporting function or other mechanism for organizing and providing a user's logged data, goals, and/or progress. The mechanism may generate a report (e.g., such as a text document or a visual diagram) for quickly identifying issues and/or accomplishments and may be provided to a user, a parent of the user, a physician, an intervention counselor, or other relevant person.

To entice users into entering information regarding characteristics and/or activities and into implementing one or more actions for promoting behavioral intervention provided by BIM 102, game mechanics may be used. Exemplary game mechanics employed may include an immersive storyline via a graphical user interface, levels or expeditions, goals, rewards, and/or other elements. For example, each week, an expedition may be accessed via an app, thereby immersing participants in the app's storyline. In this example, to complete each expedition, a certain number of points may be needed. Users may earn points for logging their meals and/or logging physical activities. More points may be awarded for more "healthy" actions or behaviors. Users may earn additional points by completing action for promoting behavioral intervention and/or participating in social components of the app.

BIM 102 may use received information about characteristics and/or activities of the user along with predetermined health information (e.g., scientifically recommended or clinically-proven dietary requirements for persons similar to the user) to determine one or more actions for promoting behavioral intervention. An action for promoting behavioral intervention may include any action for influencing a person's behavior. For example, action for promoting behavioral intervention may include an action for lifestyle change (e.g., as a diet or exercise recommendation, etc.), a biometric analysis (e.g., pulse monitoring, weight tracking, blood pressure monitoring, etc.), and/or health-related behaviors (e.g., medicine compliance, completed doctor visits, etc.). In another example, an action for promoting behavioral intervention may be a behavioral recommendation, such as a recommendation to eat 5 or more servings of fruits and vegetables a day, a recommendation to talk with other people regarding healthy lifestyle choices, or a recommendation to walk at least ten thousand steps every day.

After determining an action for promoting behavioral intervention, BIM 102 may provide the action or information associated with the action to a user. For example, a behavioral recommendation or other action for promoting behavioral intervention may be provided via a phone call, a social networking message (e.g., Facebook or Twitter), an email, or a text message. In another example, a behavioral recommendation or other action for promoting behavioral intervention may be provided via an app. When provided via an app, the behavioral recommendation or other action for promoting behavioral intervention may appear as a challenge, a goal, or other element for earning rewards (e.g., points). By providing the behavioral recommendation or other action for promoting behavioral intervention via the app, game mechanics may entice the user to complete or implement the behavioral recommendation.

Memory 104 may be any suitable entity (e.g., a non-transitory computer readable medium) for storing information. Memory 104 may include behavioral recommendations (BR) storage 106 and a user data and/or predetermined health information (UDPHI) storage 108. BR storage 106 may be any suitable entity (e.g., a database embodied or stored in a computer readable medium) for storing behavioral recommendations or other actions for promoting behavioral intervention. For example, BR storage 106 may include behavioral recommendations for children or adolescents with cancer or obesity. BR storage 106 may index behavioral recommendations or other actions for promoting behavioral intervention using various factors, including how long user has been in an intervention program and/or physiological data, such as age, height, and weight of the user.

UDPHI storage 108 may be any suitable entity for storing user data and/or predetermined health information. For example, UDPHI storage 108 may include user data regarding characteristics and/or activities of the user, e.g., collected over a period of time. UDPHI storage 108 may also include predetermined health information, including information gathered by clinical studies, patient surveys, and/or doctor assessments. The predetermined health information may include nutritional needs (e.g., daily caloric or fat intake values), exercise needs (e.g., number of steps or miles to walk or run per day), emotional needs (e.g., minutes of meditation, counseling, or social interaction with peers per day) or other information. In some embodiments, UDPHI storage 108 or another entity may maintain associations between relevant health information and a given user or class of user. For example, users associated with different conditions and/or age groups may be associated with different nutritional needs and/or exercise needs. BR storage 106 and/or UDPHI storage 108 may be accessible by one or more modules of computing module 100 and may be located externally to or integrated with one or more modules. For example, BR storage 106 and/or UDPHI storage 108 may be stored at a server located remotely from a mobile device containing BIM 102 but still accessible by BIM 102. In another example, storage 106 or 108 may be located at distributed or separated across multiple nodes.

It will be appreciated that the above described modules are for illustrative purposes and that features or portions of features described herein may be performed by different and/or additional modules, components, or nodes. For example, aspects of promoting behavioral intervention described herein may be performed by BIM 102, computing platform 100, and/or other modules or nodes.

Figure 2:
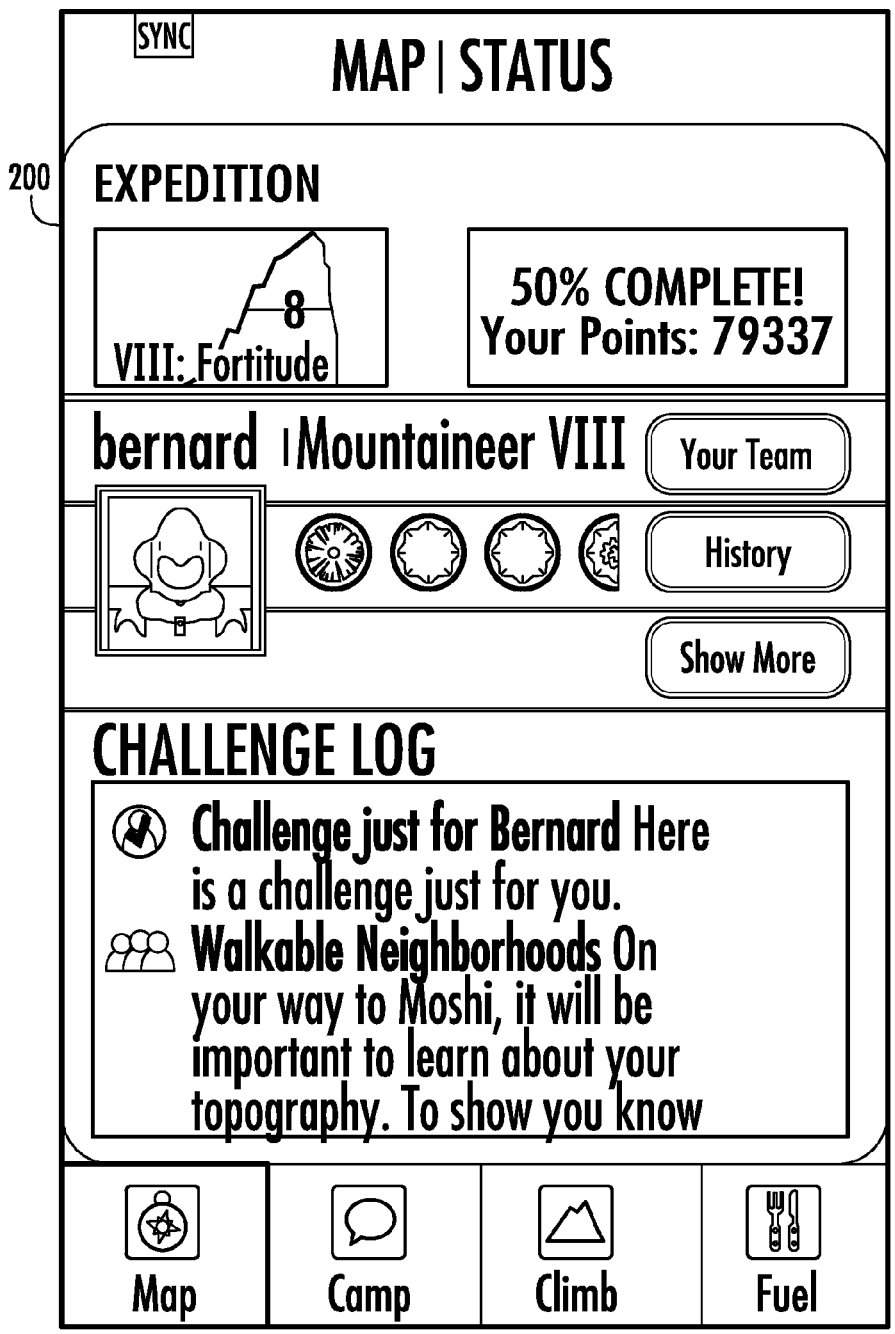
FIG. 2 is a diagram illustrating an exemplary user interface for monitoring behavioral intervention according to an embodiment of the subject matter described herein.

FIG. 2 is a diagram illustrating an exemplary user interface 200 for monitoring behavioral intervention according to an embodiment of the subject matter described herein. In some embodiments, user interface 200 may be provided to a user via an application, a game, or other software executing on a processor of a mobile device (e.g., a mobile phone or tablet computer) or a computing platform (e.g., a web server).

User interface 200 may provide status information associated with various aspects of behavior intervention using game mechanisms. User interface 200 may include an expedition pane, a user or account pane, and a challenge log pane. The expedition pane may represent a portion of user interface 200 that provides information regarding a current expedition. For example, a current expedition may include a storyline associated with performing an activity and/or obtaining a certain number of points. The expedition pane of user interface 200 may indicate a user progress associated with an expedition, such as indicating that "79,337" points have been obtained and/or that "50%" of the current expedition is complete.

A user or account pane may represent a portion of user interface 200 that provides information regarding a current user. Exemplary information provided in the account pane may include information about user's team, previous expeditions or game history, a list of badges or accomplishments, and/or access to a virtual store or item inventory. The account pane of user interface 200 may also indicate a picture or avatar associated with a user and may include user interface elements for changing or modifying the picture or avatar.

A challenge log pane may represent a portion of user interface 200 that provides information about current, past, and/or future challenges or goals. For example, a challenge may be provided by an intervention counselor or BIM 102. In this example, the intervention counselor or BIM 102 may select a challenge from a set of predetermined challenges based on user provided information and evidence-based health data. The expedition pane of user interface 200 may indicate challenges along with relevant storylines and/or challenge presenters.

Figure 3:
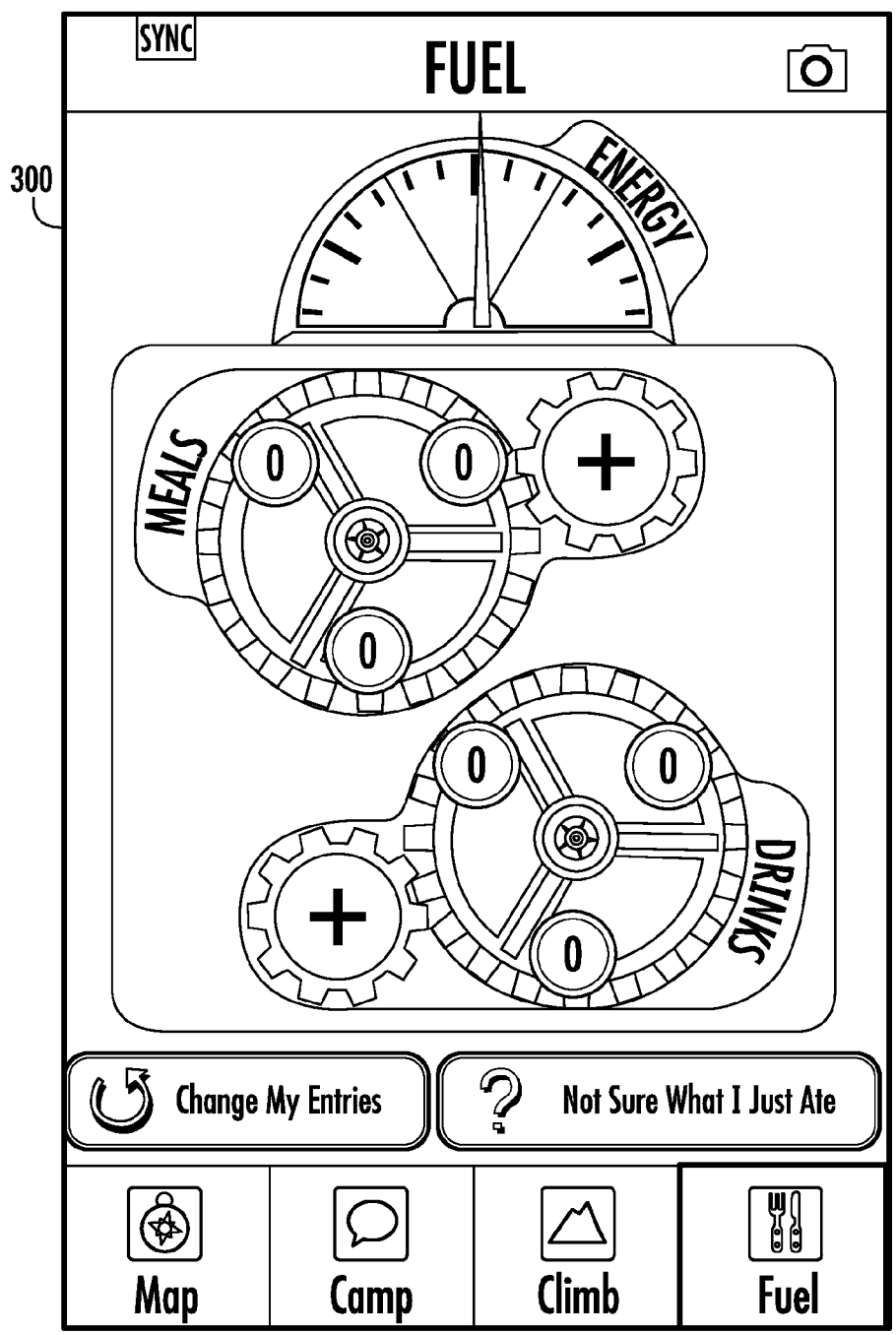
FIG. 3 is a diagram illustrating an exemplary user interface for monitoring diet according to an embodiment of the subject matter described herein.

FIG. 3 is a diagram illustrating an exemplary user interface 300 for providing diet information according to an embodiment of the subject matter described herein. In some embodiments, user interface 300 may be provided to a user via an application, a game, or other software executing on a processor of a mobile device (e.g., a mobile phone or tablet computer) or a computing platform (e.g., a web server).

User interface 300 may be usable (e.g., by a user) for providing, receiving, and/or viewing diet information. For example, diet information may include food names, food types, food amounts, or other food related information. In some embodiments, diet information may be represented using colors, numbers, letters, or other symbols.

User interface 300 may include an energy gauge, a meals tracker element, a drinks tracker element, and/or one or more user interface elements for requesting or modifying diet information. User interface 300 may indicate types of foods and/or drinks consumed during a certain period (e.g., a day, a week, or an expedition period). For example, user interface 300 may receive and/or display diet information in relation to a traffic light diet. A traffic light diet may divide different meals and drinks based on calorie and fat content into one of three different colors, e.g., green, yellow, and red. For example, a green-colored meal may contain a low amount of calories, a yellow-colored meal may contain a moderate amount of calories, and a red-colored meal may contain a high amount of calories or may be high in fat and/or sugar. Generally, users following the traffic light diet attempt to eat as much green-colored meals and/or drinks as possible and avoid red-colored meals and/or drinks, but yellow-colored meals and/or drinks are typically the most commonly consumed.

The energy gauge may include a needle for indicating calorie consumption for a user. For example, if the needle of the energy gauge is too far left, a user may be eating or consuming too few calories; if the needle is too far right, the user may be eating or consuming too many calories; and if the need is in the middle, the user may be eating or consuming an appropriate amount of calories. In some embodiments, the energy gauge may be configured so as to represent a user's particular caloric needs.

A meals tracker element may be usable for indicating amounts and types of meals consumed. For example, a user may click or select the '+' icon and may identify a meal from a list of predetermined meals and/or provide relevant information about the meal (e.g., individual food items and portion sizes). In this example, depending on whether the meal is a green-colored meal, a yellow-colored meal, or a red-colored meal, a number associated with the relevant color may be incremented and displayed by the meals tracker element.

A drinks tracker element may be usable for indicating amounts and types of drinks consumed. For example, a user may click or select the '+' icon and may identify a drink from a list of predetermined drinks or provide relevant information about the drink (e.g., number of ounces in the drink). In this example, depending on whether the drink is a green-colored drink, a yellow-colored drink, or a red-colored drink, a number associated with the relevant color may be incremented and displayed by the drinks tracker element.

A 'Not Sure What I Just Ate' user element may be for requesting help in determining how to classify a meal or drink. In some embodiments, in response to selecting the 'Not Sure What I Just Ate' user element, BIM 102 or a human (e.g., an intervention counselor) may contact user and/or request information (e.g., an uploaded picture) in helping determine what type of meal or drink was consumed.

A camera user element may be a selectable icon usable for uploading a picture of a meal or drink. In some embodiments, an uploaded picture may be analyzed by BIM 102 or a human (e.g., an intervention counselor) in determining what type of meal or drink was consumed. In some embodiments, BIM 102 may be configured to automatically classify and/or log a meal or drink based on an uploaded picture.

A 'Change My Entries' user element may be for modifying or deleting previously entered diet information. For example, in response to selecting the 'Change My Entries' user element, a second user interface may display a list of previous diet related entries for modification and/or deletion.

Figure 4:
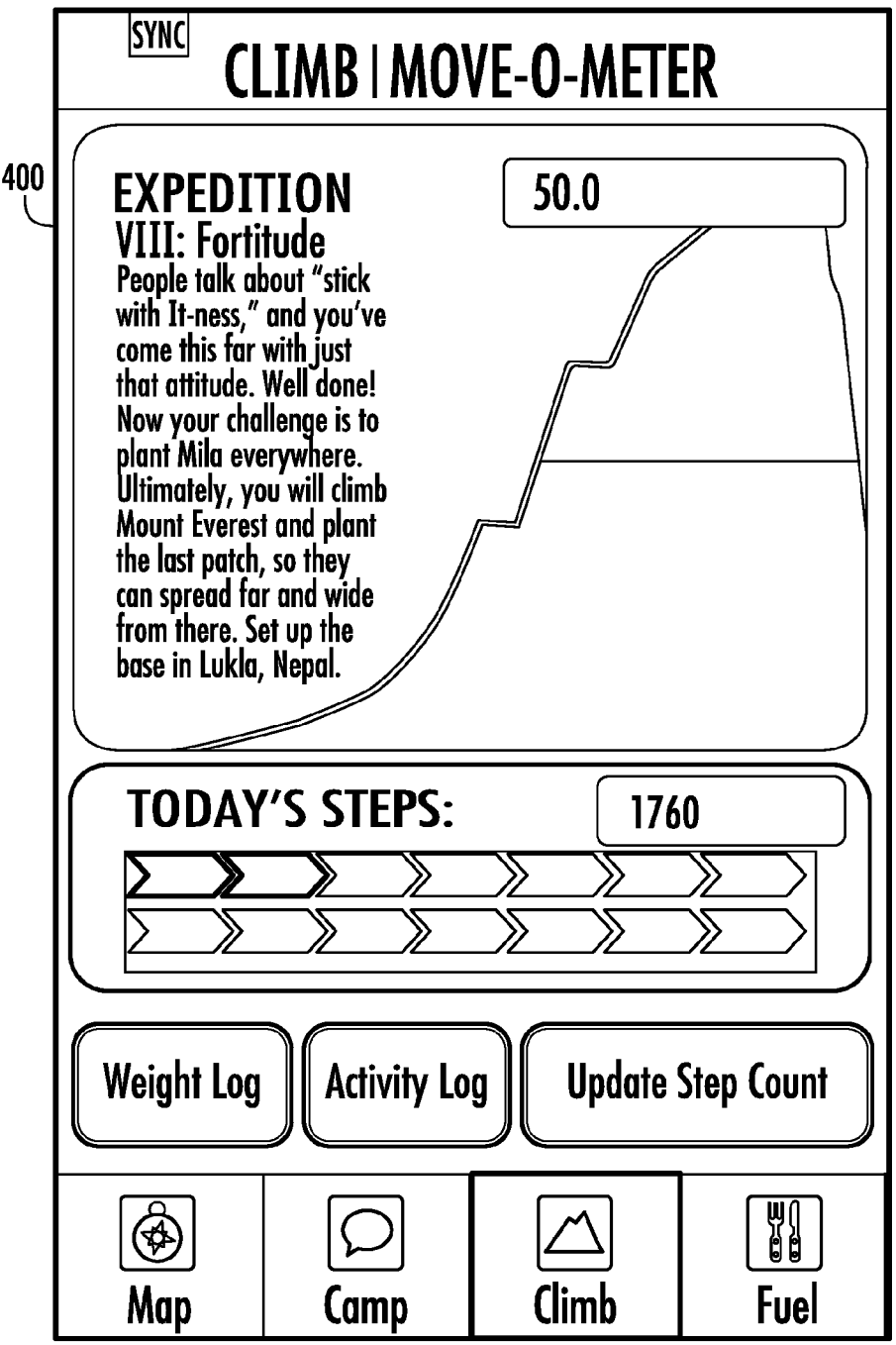
FIG. 4 is a diagram illustrating an exemplary user interface for monitoring physical activity according to an embodiment of the subject matter described herein.

FIG. 4 is a diagram illustrating an exemplary user interface 400 for providing physical activity information according to an embodiment of the subject matter described herein. In some embodiments, user interface 400 may be provided to a user via an application, a game, or other software executing on a processor of a mobile device (e.g., a mobile phone or tablet computer) or a computing platform (e.g., a web server).

User interface 400 may be usable (e.g., by a user) for providing, receiving, and/or viewing physical activity information. For example, physical activity information may include names of physical activities and duration. In some embodiments, physical activity information may be represented using colors, numbers, letters, or other symbols.

User interface 400 may include an expedition gauge, a today's steps tracker element, and/or one or more user interface elements for providing various physical activity information. The expedition gauge may be for indicating a user's progress during an expedition. For example, the expedition gauge may be represented by an unfilled, colorless mountain. In this example, as progress increases, the mountain may become filled with color. For instance, when an expedition is 50% complete, the mountain may be half filled with color.

A today's steps tracker element may be usable for indicating an amount of steps a user has taken in the last 24 hours. For example, a number of unfilled, colorless arrows may be used to represent a step quota for the day. In this example, as a step count increases, the arrows may become filled with color; and when the step quota is reached, all arrows are filled with colors.

A 'Weight Log' user element may be usable for tracking a user's weight. In some embodiments, in response to selecting the 'Weight Log' user element, a second user interface may be displayed containing a list of entries indicating weight information. The second interface may also include additional space and user interface elements for modifying entries and/or providing additional entries.

An 'Activity Log' user element may be usable for tracking a user's physical activities. In some embodiments, in response to selecting the 'Activity Log' user element, a second user interface may be displayed containing a list of entries indicating physical activities and related durations. The second interface may also include additional space and user interface elements for modifying entries and/or providing additional entries.

An 'Update Step Count' user element may be a button for providing step information. For example, in response to selecting the 'Update Step Count' user element, a second user interface may be displayed that allows a user to enter an amount of steps to add to a current steps total, e.g., via manual entry or wireless syncing with a sensor or a pedometer that is capable of tracking steps and providing step information.

A 'synch' user element may be a button or data entry mode for providing step information and/or other physical activity information. For example, in response to selecting the 'synch' user element, information from a pedometer may be automatically retrieved and stored by BIM 102 or a related application (e.g., by updating a current steps total with the retrieved information).

Figure 5:
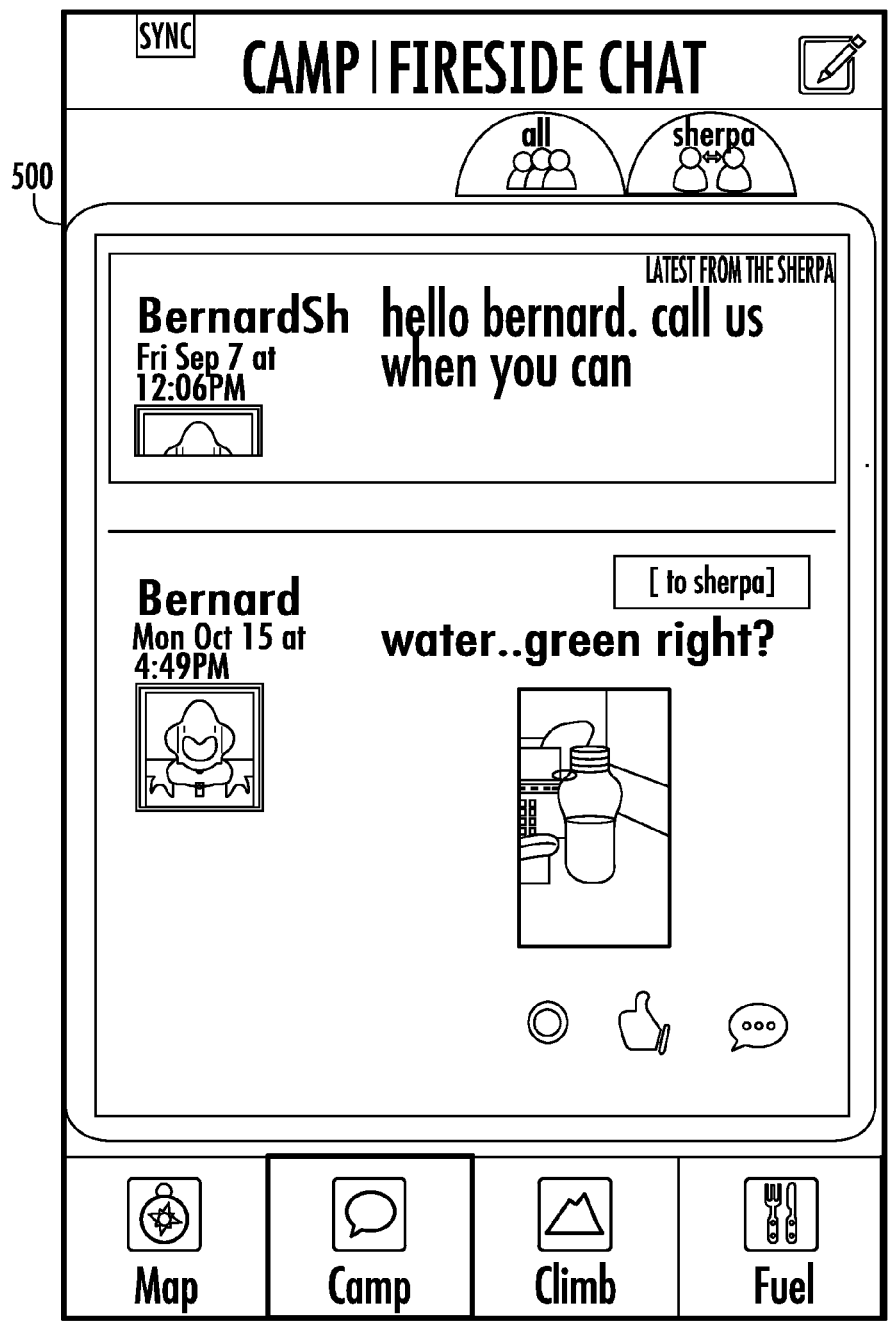
FIG. 5 is a diagram illustrating an exemplary user interface for interacting with users according to an embodiment of the subject matter described herein.

FIG. 5 is a diagram illustrating an exemplary user interface 500 for interacting with users according to an embodiment of the subject matter described herein. In some embodiments, user interface 500 may be provided to a user via an application, a game, or other software executing on a processor of a mobile device (e.g., a mobile phone or tablet computer) or a computing platform (e.g., a web server).

User interface 500 may be usable (e.g., by a user) for providing, receiving, and/or viewing communications or other social interactions. For example, user interface 500 may be usable for sending text, images, or other media to other users or groups of users and receiving media from other users or groups of users. User interface 500 may also be usable for sharing progress or relevant game information between users and/or others (e.g., intervention counselors or parents of users). In some embodiments, user interface 500 may interface with various social networks or web services, such as Facebook or Twitter.

Figure 6:
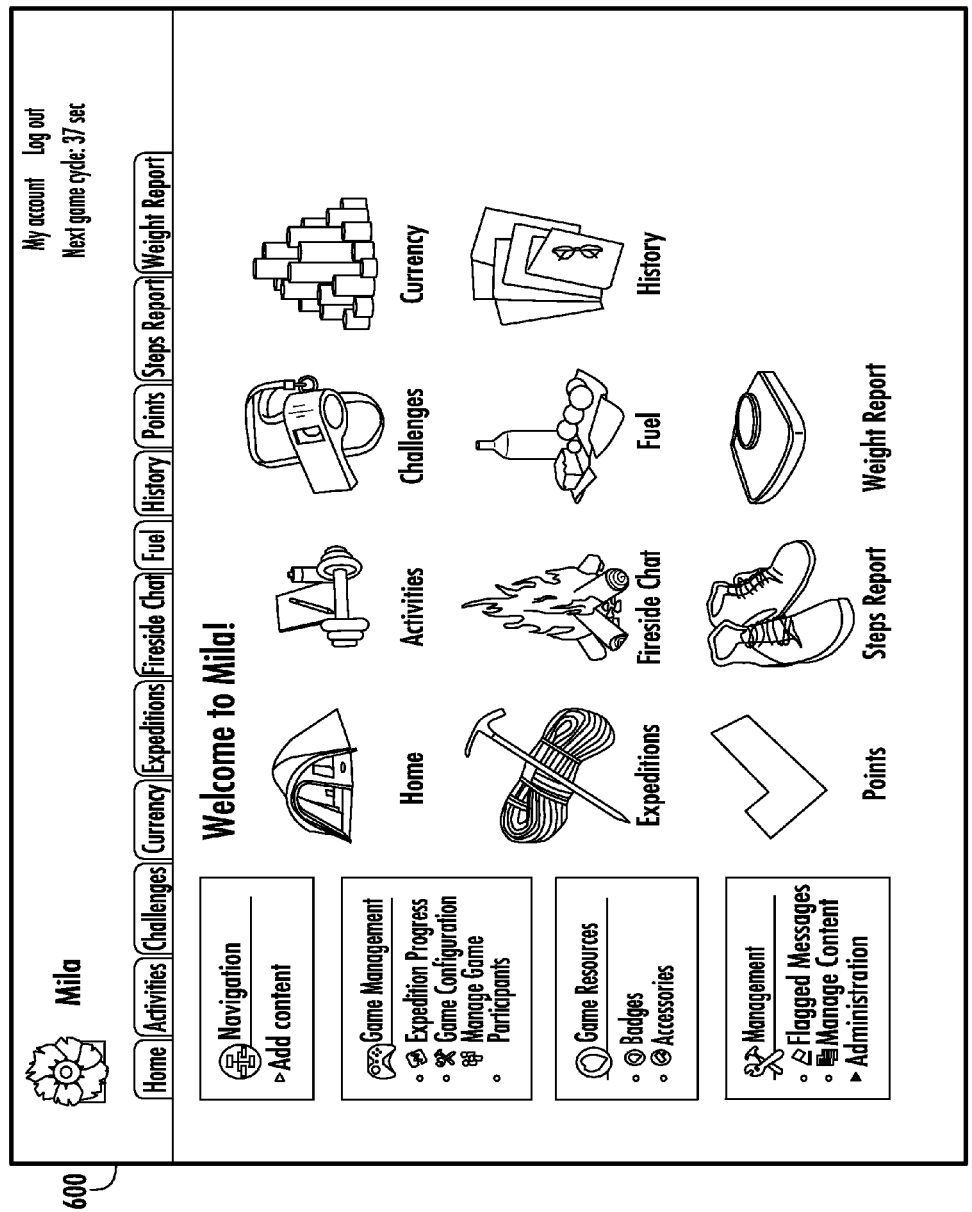
FIG. 6 is a diagram illustrating an exemplary web-based interface for promoting behavioral intervention according to an embodiment of the subject matter described herein.

FIG. 6 is a diagram illustrating an exemplary web-based interface 600 for promoting behavioral intervention according to an embodiment of the subject matter described herein. In some embodiments, user interface 600 may be accessible to a user via a web browser.

User interface 600 may be usable (e.g., by a user) for performing various administrative activities associated with a behavior intervention application or related software. User interface 600 may be usable for performing game management activities including adding, deleting, and/or modifying users and teams. User interface 600 may be usable for performing game management activities including adding, deleting, and/or modifying game elements, such as expeditions, storylines, content, challenges, badges, awards, points, and/or currency exchange rates. User interface 600 may be usable for accessing or modifying user related information including viewing and/or printing reports concerning physical activities, weight, and other information. User interface 600 may be usable for sending or receiving messages, pictures, videos, in-game communications, or other information, e.g., between users. User interface 600 may be usable for accessing or modifying historical information about a user and/or related game information, such as a user's progress during an expedition.

FIG. 7 is a diagram illustrating an exemplary web-based interface 700 for monitoring user progress according to an embodiment of the subject matter described herein. In some embodiments, user interface 700 may be accessible via a web browser. In some embodiments, user interface 700 may be displayed in response to selecting a progress icon of user interface 600.

User interface 700 may be usable (e.g., by a user) for viewing expedition progress for one or more users. For example, user interface 700 may display a table or chart containing progress or status information for users associated with a group, a team, a level, or a region. Exemplary progress or status information may include a user name, a user identifier (UID), a user level, a points amount, a points goal, a raw % complete value, a final or total expedition progress, and/or a total points goal.

In some embodiments, a user (e.g., an administrator with appropriate privileges) may modify progress or status information associated with one or more users. For example, if an administrator learns that a user completed an expedition but a technical malfunction (e.g., a phone or software problem) prevented progress information from being updated, then the administrator may update the progress information manually.

Figure 8:
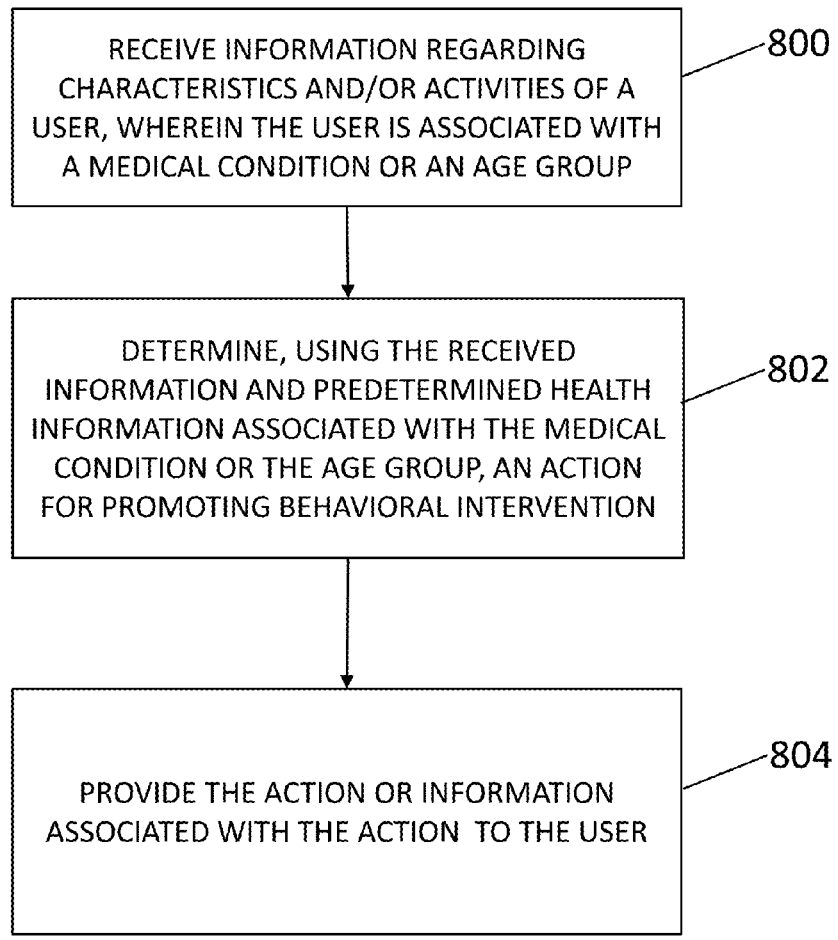
FIG. 8 is a diagram illustrating an exemplary process for promoting behavioral intervention according to an embodiment of the subject matter described herein.

FIG. 8 is a diagram illustrating an exemplary process for promoting behavioral intervention according to an embodiment of the subject matter described herein. In some embodiments, the exemplary process described herein, or portions thereof, may be performed at or by computing platform 100, BIM 102, and/or another module or node. For example, computing platform 100 may be a mobile device, a computer, or health equipment (e.g., a treadmill or stationary bike) and BIM 102 may include an application running or executing on the computing platform. In some embodiments, an exemplary progress for promoting behavioral intervention may include steps 800, 802, and/or 804.

In step 800, information regarding characteristics and/or activities of a user may be received. The user may be associated with a medical condition or an age group. For example, the user may be associated with leukemia, diabetes, cancer, a gland disorder, a dietary deficiency, or a cardiovascular disease. In another example, the user may be associated with an age group, such as children, adolescents, young adults, adults, or seniors.

In some embodiments, receiving information regarding characteristics and/or activities of the user may include inputting information via a text file, a user interface, data storage, or any combination thereof.

In some embodiments, the information regarding characteristics and/or activities of a user includes information about diet, blood pressure, blood sugar, medications, biometrics, physical activities, weight, height, age, genetics, mental health, and physical motion information associated with the user. For example, a user may input a recorded number of steps from a Bluetooth-enabled pedometer, along with a blood pressure reading before, during, and/or after the activity.

In step 802, an action for promoting behavioral intervention may be determined using the received information and predetermined health information associated with the medical condition or the age group. For example, an action for promoting behavioral intervention may be determined based on predetermined health information associated with the user or other evidence, such as information provided by physician or the user.

In some embodiments, the action for promoting behavioral intervention may include a physical recommendation, a diet recommendation, a biometrics analysis, a physiological or emotional recommendation, or any combination thereof.

In some embodiments, determining the action for promoting behavioral intervention may include selecting an action for promoting behavioral intervention from a plurality of preconfigured actions for promoting behavioral intervention and modifying the length or amount of the action so as to not exceed a target goal based on the received information and the predetermined health information. For example, a user may be a child of age 7 and a survivor of ALL. The predetermined health information associated with the user may indicate that the user should be receiving at least 5 serving of fruits and/or vegetable daily. The user data may indicate the user is currently eating 3 servings daily. Using this information, a generic behavioral recommendation, such as "eat more _____ servings of fruits and/or vegetables than yesterday" may be selected. The selection may be modified such that the behavioral recommendation encourages the user to eat the recommended daily servings. In this example, the generic behavioral recommendation may be modified to read "eat 2 more servings of fruits and/or vegetables than yesterday."

In some embodiments, an action for promoting behavioral intervention may be provided using game mechanics. For example, an action may be requesting 2 servings of fruits and/or vegetables be eaten. In this example, the action may be modified or configured so as to present the request to a user of a game via a storyline driven challenge, such as a message appearing during the game stating that: "The expedition is in trouble because of a food shortage. You should eat 2 servings of fruits and/or vegetables in 24 hours to prevent returning to base camp (i.e., starting over)".

In step 804, the action or information associated with the action may be provided to the user. In some embodiments, providing the action to the user may include providing the action or information associated with the action (e.g., a health report based on biometric analysis) via a user interface, a text message, a social networking message, a phone call, an automated voice message, or any combination thereof.

In some embodiments, the user may be enticed to complete or perform the action for promoting behavioral intervention by using game mechanics (e.g., provided via an app). In such embodiments, the user may be rewarded via the game mechanics in response to completing the action for promoting behavioral intervention.

In some embodiments, the game mechanics may include virtual currency, a virtual avatar accessory, a virtual environment item, a gift, money, a physical item, progress in a gaming environment, a social acknowledgement, or any combination thereof.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for promoting behavioral intervention via evidence-based recommendations, the method comprising:

at a web server including a processor and memory:

receiving, via a mobile device communicatively coupled to the web server, information regarding characteristics or activities of a user, wherein the user is associated with a medical condition or an age group;

indexing, in a memory accessible to the web server and using information regarding how long the user has been in an intervention program and physiological data about the user, a plurality of preconfigured actions for promoting behavioral interventions;

determining, at the web server and using the received information and predetermined health information associated with the medical condition or the age group, an action for promoting behavioral intervention, wherein determining the action for promoting behavioral intervention includes selecting the action from the plurality of preconfigured actions and modifying the length or amount of the action so as to not exceed a target goal based on the received information and the predetermined health information; and providing, via the mobile device, the action or information associated with the action to the user, wherein providing the action or information associated with the action to the user includes modifying a game element in an interactive game being played by the user via the mobile device thereby enticing the user to complete the action for promoting behavioral intervention using game mechanics.

2. The method of claim 1 comprising:

in response to completing the action for promoting behavioral intervention, rewarding the user via the game mechanics.

3. The method of claim 1 wherein the game mechanics includes virtual currency, a virtual avatar accessory, a virtual environment item, a gift, money, a physical item, progress in a gaming environment, a social acknowledgement, or any combination thereof.

4. The method of claim 1 wherein receiving information regarding characteristics or activities of the user includes inputting information via a text file, a user interface, data storage, or any combination thereof.

5. The method of claim 1 wherein receiving information regarding characteristics or activities of a user includes obtaining physical motion information associated with the user from a pedometer.

6. The method of claim 1 wherein the information regarding characteristics or activities of a user includes information about diet, blood pressure, blood sugar, medications, biometrics, physical activities, weight, height, age, genetics, mental health, and physical motion information associated with the user.

7. The method of claim 1 wherein the medical condition includes leukemia, diabetes, cancer, a gland disorder, a dietary deficiency, or a cardiovascular disease.

8. The method of claim 1 wherein the age group includes children, adolescents, young adults, adults, or seniors.

9. The method of claim 1 wherein the predetermined health information includes dietary requirements, physical exercise requirements, psychological needs, or any combination thereof.

10. The method of claim 1 wherein the predetermined health information includes information gathered by clinical studies, patient surveys, doctor assessments, or any combination thereof.

11. The method of claim 10 wherein the action for promoting behavioral intervention is based on the predetermined health information or other evidence.

12. The method of claim 1 wherein the action for promoting behavioral intervention includes a physical recommendation, a diet recommendation, a physiological or emotional recommendation, or any combination thereof.

13. The method of claim 1 wherein providing the action or information associated with the action to the user includes providing the action or information associated with the action via a user interface, a text message, a social networking message, a phone call, an automated voice message, or any combination thereof.

14. A system for promoting behavioral intervention via evidence-based recommendations, the system comprising:

a web server including a processor and memory, the computing platform including:

a behavioral intervention module (BIM) configured to receive, via a mobile device communicatively coupled to the web server, information regarding characteristics or activities of a user, wherein the user is associated with a medical condition or an age group, to index, in a memory accessible to the web server and using information regarding how long the user has been in an intervention program and physiological data about the user, a plurality of preconfigured actions for promoting behavioral interventions, to determine, at the web server and using the received information and predetermined health information associated with the medical condition or the age group, an action for promoting behavioral intervention, wherein determining the action for promoting behavioral intervention includes selecting the action from the plurality of preconfigured actions and modifying the length or amount of the action so as to not exceed a target goal based on the received information and the predetermined health information; and to provide, via the mobile device, the action for promoting behavioral intervention to the user, wherein providing the action or information associated with the action to the user includes modifying a game element in an interactive game being played by the user via the mobile device thereby enticing the user to complete the action for promoting behavioral intervention using game mechanics.

15. The system of claim 14 wherein the BIM is configured to in response to completing the action for promoting behavioral intervention, reward the user via the game mechanics.

16. The system of claim 15 wherein the game mechanics includes virtual currency, a virtual item, a physical item, progress in a gaming environment, or a social acknowledgement.

17. The system of claim 14 wherein receiving information regarding characteristics or activities of the user includes inputting information via a text file, a user interface, data storage, or any combination thereof.

18. The system of claim 14 wherein receiving information regarding characteristics or activities of a user includes synching physical motion information associated with the user from a pedometer.

19. The system of claim 14 wherein the computing platform includes a mobile device, a computer, or health equipment and the BIM includes an application running or executing on the computing platform.

20. The system of claim 14 wherein the information regarding characteristics or activities of a user includes information about diet, blood pressure, blood sugar, medications, biometrics, physical activities, weight, height, age, genetics, mental health, and physical motion information associated with the user.

21. The system of claim 14 wherein the medical condition includes leukemia, diabetes, cancer, a gland disorder, a dietary deficiency, or a cardiovascular disease.

22. The system of claim 14 wherein the age group includes children, adolescents, young adults, adults, or seniors.

23. The system of claim 14 wherein the predetermined health information includes dietary requirements, physical exercise requirements, psychological needs, or any combination thereof.

24. The system of claim 14 wherein the predetermined health information includes information gathered by clinical studies, patient surveys, doctor assessments, or any combination thereof.

25. The system of claim 24 wherein the action for promoting behavioral intervention is based on the predetermined health information or other evidence.

26. The method of claim 1 wherein the action for promoting behavioral intervention includes a physical recommendation, a diet recommendation, a physiological or emotional recommendation, or any combination thereof.

27. The system of claim 14 wherein providing the action or information associated with the action to the user includes providing the action or information associated with the action via a user interface, a text message, a social networking message, a phone call, an automated voice message, or any combination thereof.

28. A non-transitory computer readable medium comprising computer executable instructions embodied in the computer readable medium that when executed by a processor of a computer control the computer to perform steps comprising:
   at a web server:
      receiving, via a mobile device communicatively coupled to the web server, information regarding characteristics or activities of a user, wherein the user is associated with a medical condition or an age group;
      indexing, in a memory accessible to the web server and using information regarding how long the user has been in an intervention program and physiological data about the user, a plurality of preconfigured actions for promoting behavioral interventions;
      determining, at the web server and using the received information and predetermined health information associated with the medical condition or the age group, an action for promoting behavioral intervention, wherein determining the action for promoting behavioral intervention includes selecting the action from the plurality of preconfigured actions and modifying the length or amount of the action so as to not exceed a target goal based on the received information and the predetermined health information; and
      providing, via the mobile device, the action or information associated with the action to the user, wherein providing the action or information associated with the action to the user includes modifying a game element in an interactive game being played by the user via the mobile device thereby enticing the user to complete the action for promoting behavioral intervention using game mechanics.

29. The method of claim 1 wherein receiving the information regarding characteristics or activities of the user includes receiving a picture of a meal and automatically classifying the meal using a meal classification system based on the picture.

30. The method of claim 1 wherein modifying the length or amount of the action so as to not exceed the target goal includes determining the target goal by calculating, using the medical condition or the age group associated with the user, nutritional needs or exercise needs of the user.

31. The method of claim 1 wherein modifying the game element includes adjusting an energy gauge for indicating an appropriate amount of calories for the user to consume.

32. The method of claim 1 wherein modifying the game element includes adjusting a physical activity gauge for indicating an appropriate amount of physical activity for the user to perform.

33. The system of claim 14 wherein receiving the information regarding characteristics or activities of the user includes receiving a picture of a meal and automatically classifying the meal using a meal classification system based on the picture.

34. The system of claim 14 wherein modifying the length or amount of the action so as to not exceed the target goal includes determining a target goal by calculating, using the medical condition or the age group associated with the user, nutritional needs or exercise needs of the user.

35. The system of claim 14 wherein modifying the game element includes adjusting an energy gauge for indicating an appropriate amount of calories for the user to consume.

36. The system of claim 14 wherein modifying the game element includes adjusting a physical activity gauge for indicating an appropriate amount of physical activity for the user to perform.

\* \* \* \* \*